US010303551B2

United States Patent
Borlick et al.

(10) Patent No.: US 10,303,551 B2
(45) Date of Patent: *May 28, 2019

(54) ALTERNATIVE PORT ERROR RECOVERY WITH LIMITED SYSTEM IMPACT

(71) Applicant: INTERNATIONAL BUSINESS MACHINES CORPORATION, Armonk, NY (US)

(72) Inventors: Matthew G. Borlick, Tucson, AZ (US); Steven E. Klein, Tucson, AZ (US); Ashwani Kumar, Tucson, AZ (US); Micah Robison, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 15/263,687

(22) Filed: Sep. 13, 2016

(65) Prior Publication Data

US 2016/0378609 A1 Dec. 29, 2016

Related U.S. Application Data

(63) Continuation of application No. 14/310,394, filed on Jun. 20, 2014, now Pat. No. 9,459,972.

(51) Int. Cl.
| | |
|---|---|
| *G06F 11/00* | (2006.01) |
| *G06F 11/14* | (2006.01) |
| *G06F 11/20* | (2006.01) |
| *G06F 11/07* | (2006.01) |
| *G06F 3/06* | (2006.01) |
| *G06F 11/10* | (2006.01) |

(52) U.S. Cl.
CPC ......... *G06F 11/1438* (2013.01); *G06F 3/06* (2013.01); *G06F 11/0793* (2013.01); *G06F 11/1064* (2013.01); *G06F 11/1443* (2013.01); *G06F 11/20* (2013.01); *G06F 2201/805* (2013.01); *G06F 2201/85* (2013.01)

(58) Field of Classification Search
CPC ...................................................... G06F 11/20
See application file for complete search history.

(56) References Cited

U.S. PATENT DOCUMENTS

| | | |
|---|---|---|
| 4,817,091 A | 3/1989 | Katzman et al. |
| 5,303,351 A | 4/1994 | Jackowski et al. |

(Continued)

FOREIGN PATENT DOCUMENTS

EP 0472867 A2 3/1992

OTHER PUBLICATIONS

Dugan et al., "Dynamic Fault-Tree Models for Fault-Tolerant Computer Systems," IEEE Transactions on Reliability, vol. 41, No. 3, Sep. 1992 (15 pages).

*Primary Examiner* — Christopher S McCarthy
(74) *Attorney, Agent, or Firm* — Griffiths & Seaton PLLC

(57) ABSTRACT

Various embodiments for troubleshooting a network device in a computing storage environment by a processor. A determination is made if a parity error in a specific port is either an instruction cache parity error or a recoverable data cache type parity error. If the parity error is determined not to be the instruction cache parity error, and determined not to be the recoverable data cache type parity error, a full recovery operation is initiated.

15 Claims, 2 Drawing Sheets

(56) References Cited

U.S. PATENT DOCUMENTS

| | | | |
|---|---|---|---|
| 5,321,698 A * | 6/1994 | Nguyen | G06F 11/1402 714/17 |
| 6,622,263 B1 | 9/2003 | Stiffler et al. | |
| 6,912,610 B2 | 6/2005 | Spencer | |
| 7,106,742 B1 | 9/2006 | Frisch et al. | |
| 7,904,751 B2 * | 3/2011 | Marisetty | G06F 11/0793 714/10 |
| 8,782,461 B2 | 7/2014 | Muthrasanallur et al. | |
| 8,909,988 B2 | 12/2014 | Sperber et al. | |
| 9,019,842 B2 | 4/2015 | Akahane et al. | |
| 9,110,768 B2 | 8/2015 | Iacobovici | |
| 9,459,972 B2 * | 10/2016 | Borlick | G06F 11/20 |
| 2004/0088523 A1 | 5/2004 | Kessler et al. | |
| 2005/0076113 A1 | 4/2005 | Klotz et al. | |
| 2005/0081124 A1 | 4/2005 | Luick | |
| 2008/0307287 A1 | 12/2008 | Crowell et al. | |
| 2012/0079312 A1 | 3/2012 | Muthrasanallur et al. | |
| 2012/0275294 A1 | 11/2012 | Suresh et al. | |
| 2013/0262926 A1 | 10/2013 | Sperber et al. | |
| 2014/0188965 A1 | 7/2014 | Iacobovici | |

* cited by examiner

ALTERNATIVE PORT ERROR RECOVERY WITH LIMITED SYSTEM IMPACT

CROSS-REFERENCE TO RELATED APPLICATIONS

This Application is a Continuation of U.S. patent application Ser. No. 14/310,394, filed Jun. 20, 2014, the contents of which are hereby incorporated by reference.

BACKGROUND OF THE INVENTION

Field of the Invention

The present invention relates in general computing systems, and more particularly to, various embodiments for effecting alternative port recovery mechanisms without significantly impacting an entire computing system.

Description of the Related Art

Today with modern technology, large volumes of data are storable on disk drives and modern devices such as Solid State Devices (SSDs) and other storage mediums; these drives and other devices can exist as a solo entity, or as part of a broader make up within a larger storage environment. As the sheer volume of data in today's information-based society continues to increase, so too does the demands placed on data transfer infrastructures such as fibre channel cabling and other data communications mechanisms.

SUMMARY OF THE INVENTION

In high-availability systems such as in Enterprise Storage environments, it is important to maintain communication paths via host adapter ports. Occasionally, the port being used as an access point to a particular storage unit reports an internal error. Currently, all such errors are accommodated by resetting the port that reported the error, and then subjecting the entire storage device through a system-wide recovery operation. This current recovery operation may be disruptive to the system, and not beneficial, as the recovery may impact all ports (versus just the affected port), including those that did not report the initial error. Depending on the current mode of operation at the time of the initial port error and configuration, such a system-wide operation could result in a total loss of access to a storage system.

The mechanisms of the illustrated embodiments take advantage of the typical circumstances in storage environments that some port errors are known to be transient, and thus do not require data capture. By differentiating which errors are transient, and which are not, among other factors, for example, the mechanisms of the illustrated embodiments implement functionality that performs recovery operations on the affected port, and limits, where possible, exposure of the recovery operation to other ports and areas of the storage environment that are operating normally, allowing the storage environment to continue to be accessible.

Accordingly, in light of the foregoing, various embodiments for troubleshooting a network device in a computing storage environment by a processor are provided. In one embodiment, by way of example only, a method is disclosed for troubleshooting a network device in a computing storage environment. A determination is made if a parity error in a specific port is either an instruction cache parity error or a recoverable data cache type parity error. If the parity error is determined not to be the instruction cache parity error, and determined not to be the recoverable data cache type parity error, a full recovery operation is initiated.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, in high-availability systems such as in Enterprise Storage environments, it is important to maintain communication paths via host adapter ports. Occasionally, the port being used as an access point to a particular storage unit reports an internal error. Currently, all such errors are accommodated by resetting the port that reported the error, and then subjecting the entire storage device through a system-wide recovery operation. This current recovery operation may be disruptive to the system, and not beneficial, as the recovery may impact all ports (versus just the affected port), including those that did not report the initial error. Depending on the current mode of operation at the time of the initial port error and configuration, such a system-wide operation could result in a total loss of access to a storage system.

Again, as previously mentioned, the mechanisms of the illustrated embodiments take advantage of the typical circumstances in storage environments that some port errors are known to be transient, and thus do not require data capture. By differentiating which errors are transient, and which are not, among other factors, for example, the mechanisms of the illustrated embodiments implement functionality that performs recovery operations on the affected port, and limits, where possible, exposure of the recovery operation to other ports and areas of the storage environment that are operating normally, allowing the storage environment to continue to be accessible.

Figure 1:
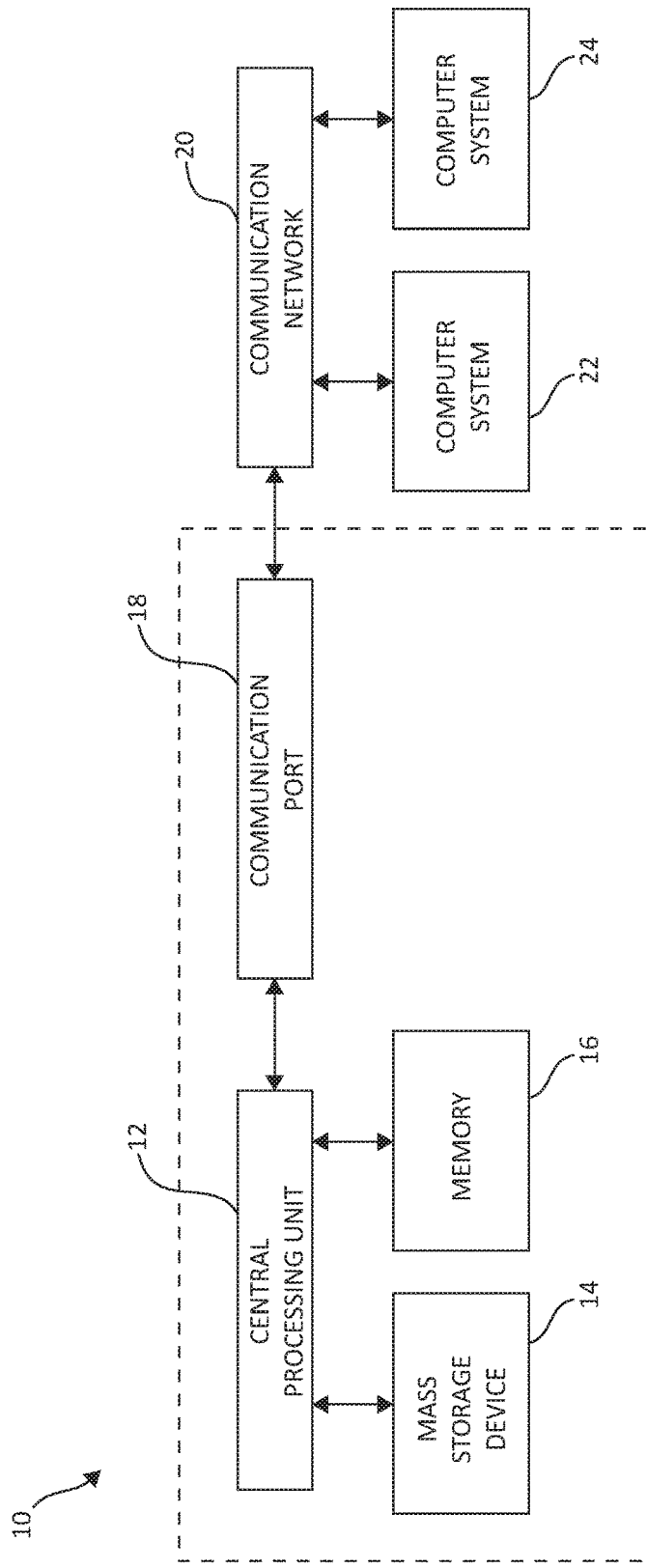
FIG. 1 is an exemplary block diagram showing a hardware structure for performing link speed regulation functionality, in which aspects of the present invention may be realized.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The communication port 18, communication network 20, and other components not pictured for the sake of brevity but known to the skilled artisan may include such hardware components as fibre channel cabling, fibre channel ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

With the knowledge of the transient nature of a port error (e.g., parity errors), one can effect recovery operations in a different manner. Rather than going into an enclosure, or system-wide recovery, upon detecting a port error interrupt, for example, the mechanisms of the present invention may handle recoverable parity errors by resetting the individual port "silently." Because the port is being reset, certain cleanup may be performed prior to the reset operation. Specifically, for example, all active transactions that are currently waiting for a response from the port will have to be cleanly terminated, and the state of the port shall have to be re-instated to the pre-reset state (e.g., to preserve logins and other information as previously mentioned) after the port reset operation is completed.

Further improvement over current mechanisms is realized by eliminating the need to obtain/pull data from the affected port in order to analyze the data to be able to tell what the error was. Instead, port data need not be obtained, and a recovery may be effected with minimal impact to the overall system. In a properly configured storage network, for example, this reset operation will execute silently, as any active Input/Output (I/O) operations may be conducted over alternate communications paths.

In one embodiment of the present invention, when port hardware reports a parity, the mechanisms of the present invention check to determine if the error is of a certain recoverable type (e.g., parity error). If such a recoverable error is identified, the system then takes steps to implement certain alternative recovery strategies as will be further detailed, following. These alternative strategies allow for the computing storage environment to continue being accessible, while only the affected port is undergoing recovery efforts.

Figure 2:
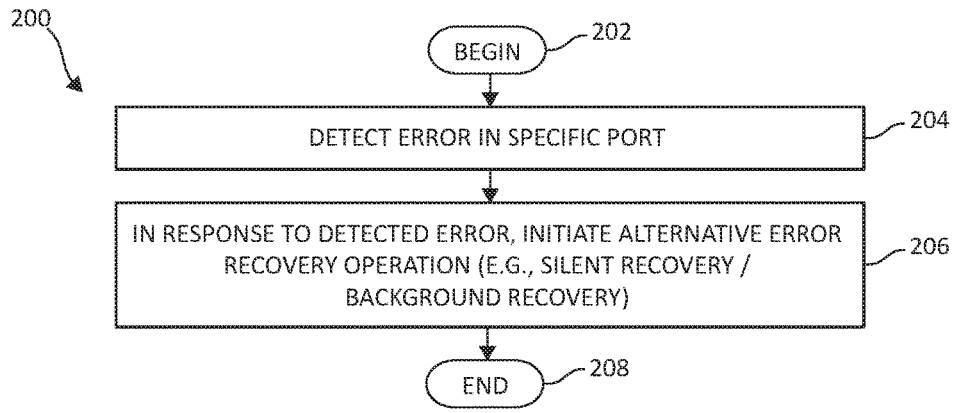
FIG. 2 is a flow chart diagram illustrating an exemplary method for troubleshooting a network device in a computing storage environment, again in which aspects of the present invention may be realized.

Turning now to FIG. 2, a flow chart diagram of exemplary functionality for implementing troubleshooting functionality according to various aspects of the present invention is shown by method 200. Method 200 begins (step 202) by detecting an error in a specific port (step 204). For example, as previously mentioned, the method 200 may detect that certain port hardware has reported an error. The method then determines which type of error is received, and, for example, whether the error is of a certain recoverable type. In response to the detected error and the aforementioned determinations, the method then initiates an alternative error recovery operation (e.g., silent and/or background error recovery operation) as will be further described (step 206). The method 200 then ends (step 208).

Figure 3:
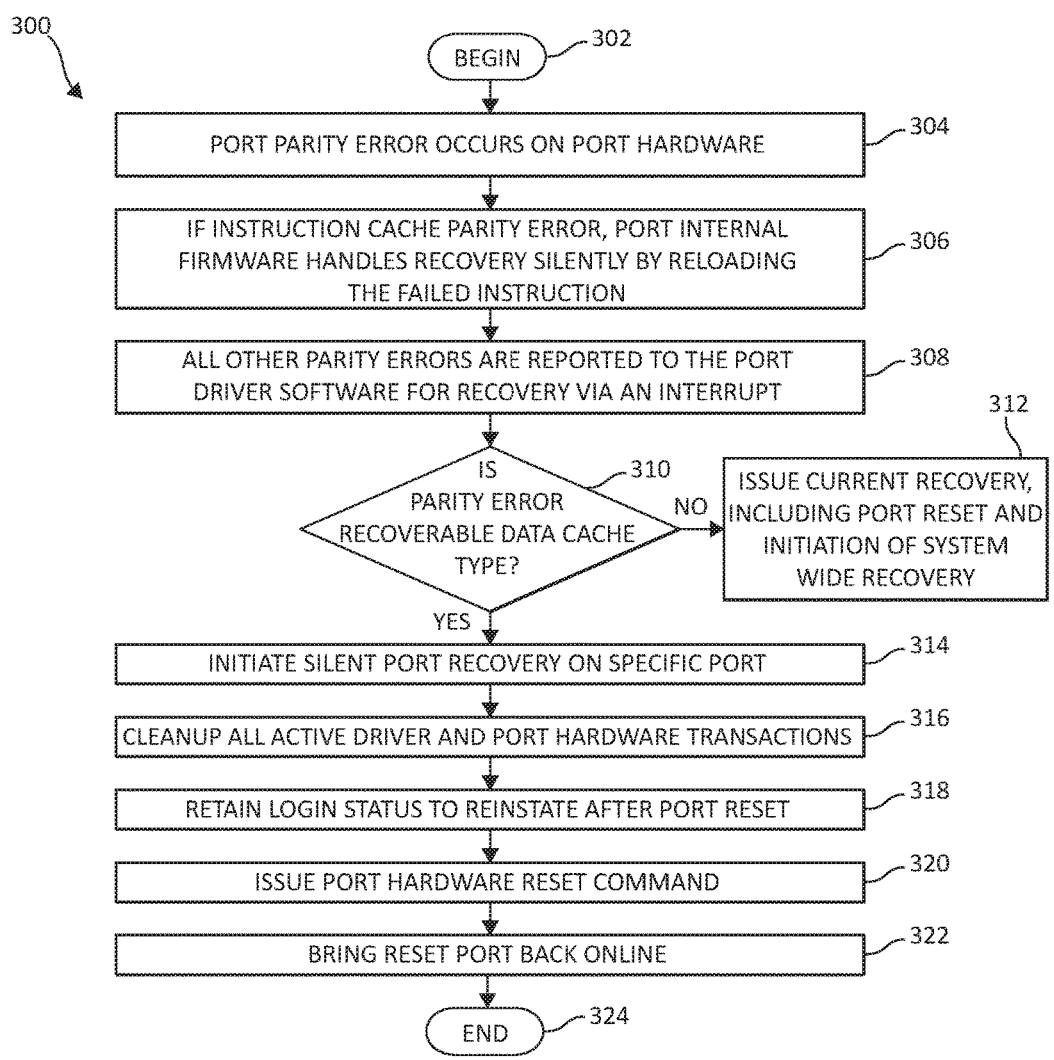
FIG. 3 is an additional flow chart diagram illustrating an additional exemplary method for effecting troubleshooting functionality of a network device, such as a port, in a computing storage environment, here again in which aspects of the present invention may be implemented.

Turning now to FIG. 3, a flow chart illustration of an exemplary method for effecting storage network troubleshooting functionality in accordance with various aspects of the illustrated embodiments is depicted as method 300. Method 300 begins (step 302) with the aforementioned detection of an error. In this case, a port parity error occurs on specific port hardware (step 304). If the system determines that the port parity error is of an instruction cache parity error type, then port internal firmware initiates a first kind of alternative recovery mechanism by handling the recovery on a silent basis by reloading the failed instruction (step 306). All remaining parity errors are reported to the port driver software for recovery via an interrupt (step 308).

The method 300 then continues to step 310, which queries if the parity error is a recoverable data cache type as previously described. If the system has determined that the error is not such a type, then the standard recovery mechanisms are implemented (step 312) which may include a system-wide recovery operation and other functionality as previously described.

Returning to step 310, if the method 300 determines that the error is a recoverable data cache type parity error, a series of steps 314-322 may be performed on the specific port as will be described. In one embodiment, steps 314-322 may be performed in phases, where method 300 returns to a normal operation as one of ordinary skill in the art will appreciate, for other work to complete on other ports, after each of the steps 314-322 is performed.

In step 314, the system initiates a silent port recovery on the specific port. This renders the port unusable until the port recovery operation is complete. In a following step, a cleanup operation is performed on all active driver and port hardware transactions, as no responses are expected after the upcoming reset operation (step 316).

In step 318, following, the applicable login status is retained, such that the status may be reinstated after the port reset operation. The port hardware reset command is issued (step 320). The reset port is then brought back online (step 322). The specific port is now available to the same paths that existed at the time of error. The method 300 then ends (step 324).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for troubleshooting a network device in a computing storage environment by a processor, comprising:
    determining if a parity error in a specific port is one of an instruction cache parity error, and a recoverable data cache type parity error;
    if the parity error is determined not to be the instruction cache parity error, and determined not to be the recoverable data cache type parity error, initiating a full recovery operation; wherein, if the parity error is determined to be one of the instruction cache parity error and the recoverable data cache type parity error, an alternative error recovery operation is performed; and
    retaining, through the alternative error recovery operation, a login status of the specific port, such that following the alternative error recovery operation the login status is reinstated to a pre-reset state.

2. The method of claim 1, wherein the alternative error recovery operation on the port is initiated by performing at least one of:

initiating a silent recovery operation by reloading a failed instruction,
taking the port offline,
cleaning up any active transactions associated with the port,
performing a hardware reset operation port, and
bringing the port online.

3. The method of claim 2, further including detecting the parity error in the specific port.

4. The method of claim 2, wherein if the parity error is determined to be the instruction cache parity error, the silent recovery operation is initiated.

5. The method of claim 2, further including, if the parity error is determined not to be the instruction cache parity error, reporting the parity error to a driver of the port for recovery via an interrupt.

6. A system for troubleshooting a network device in a computing storage environment, comprising:
a processor, operational in the computing storage environment, wherein the processor:
determines if a parity error in a specific port is one of an instruction cache parity error, and a recoverable data cache type parity error;
if the parity error is determined not to be the instruction cache parity error, and determined not to be the recoverable data cache type parity error, initiates a full recovery operation; wherein, if the parity error is determined to be one of the instruction cache parity error and the recoverable data cache type parity error, an alternative error recovery operation is performed; and
retains, through the alternative error recovery operation, a login status of the specific port, such that following the alternative error recovery operation the login status is reinstated to a pre-reset state.

7. The system of claim 6, wherein the alternative error recovery operation on the port is initiated by performing at least one of:
initiating a silent recovery operation by reloading a failed instruction,
taking the port offline,
cleaning up any active transactions associated with the port,
performing a hardware reset operation port, and
bringing the port online.

8. The system of claim 7, wherein the processor detects the parity error in the specific port.

9. The system of claim 7, wherein if the parity error is determined to be the instruction cache parity error, the silent recovery operation is initiated.

10. The system of claim 7, wherein, if the parity error is determined not to be the instruction cache parity error, the processor reports the parity error to a driver of the port for recovery via an interrupt.

11. A computer program product for troubleshooting a network device in a computing storage environment by a processor, the computer program product comprising a non-transitory computer-readable storage medium having computer-readable program code portions stored therein, the computer-readable program code portions comprising:
an executable portion that determines if a parity error in a specific port is one of an instruction cache parity error, and a recoverable data cache type parity error;
an executable portion that, if the parity error is determined not to be the instruction cache parity error, and determined not to be the recoverable data cache type parity error, initiates a full recovery operation; wherein, if the parity error is determined to be one of the instruction cache parity error and the recoverable data cache type parity error, an alternative error recovery operation is performed; and
an executable portion that retains, through the alternative error recovery operation, a login status of the specific port, such that following the alternative error recovery operation the login status is reinstated to a pre-reset state.

12. The computer program product of claim 11, wherein the alternative error recovery operation on the port is initiated by performing at least one of:
initiating a silent recovery operation by reloading a failed instruction,
taking the port offline,
cleaning up any active transactions associated with the port,
performing a hardware reset operation port, and
bringing the port online.

13. The computer program product of claim 12, further including an executable portion that detects the parity error in the specific port.

14. The computer program product of claim 12, wherein if the parity error is determined to be the instruction cache parity error, the silent recovery operation is initiated.

15. The computer program product of claim 12, further including an executable portion that, if the parity error is determined not to be the instruction cache parity error, reports the parity error to a driver of the port for recovery via an interrupt.

* * * * *